United States Patent
Lawson et al.

(10) Patent No.: US 7,516,046 B2
(45) Date of Patent: Apr. 7, 2009

(54) NETWORK DIAGNOSTIC SYSTEM WITH PROGRAMMABLE OSCILLATOR

(75) Inventors: A. Michael Lawson, Morgan Hill, CA (US); Paul R. Gentieu, Sunnyvale, CA (US); Paul Abrahams, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 399 days.

(21) Appl. No.: 11/344,829

(22) Filed: Feb. 1, 2006

(65) Prior Publication Data

US 2006/0246845 A1  Nov. 2, 2006

Related U.S. Application Data

(60) Provisional application No. 60/649,002, filed on Feb. 1, 2005.

(51) Int. Cl.
*G06F 15/00* (2006.01)

(52) U.S. Cl. .................. 702/183; 702/122; 702/188; 370/252; 370/538; 455/182.2; 455/226.1; 455/255; 455/67.11

(58) Field of Classification Search ............... 702/122, 702/188, 183; 375/316, 224, 216, 217; 455/184.1, 455/196.1, 226.1, 255, 142, 67.11, 164.1, 455/67.13, 258, 62, 182.2, 192.2, 192.1, 455/199, 127.1; 370/342, 350, 347, 503, 370/252, 203, 538, 210
See application file for complete search history.

(56) References Cited

U.S. PATENT DOCUMENTS

| | | | |
|---|---|---|---|
| 6,295,272 B1 * | 9/2001 | Feldman et al. ............. 370/210 |
| 6,880,070 B2 | 4/2005 | Gentieu et al. | |
| 6,929,272 B2 * | 8/2005 | Matsumoto et al. ... 280/124.109 |
| 6,941,482 B2 | 9/2005 | Strong | |
| 7,007,208 B1 | 2/2006 | Hibbert et al. | |
| 7,218,901 B1 * | 5/2007 | Mobley et al. ............ 455/182.2 |
| 2003/0053493 A1 * | 3/2003 | Graham Mobley et al. .. 370/538 |
| 2004/0133733 A1 | 7/2004 | Bean et al. | |
| 2005/0050190 A1 | 3/2005 | Dube | |
| 2005/0060402 A1 | 3/2005 | Oyadomari et al. | |
| 2005/0060403 A1 | 3/2005 | Bernstein et al. | |
| 2005/0060409 A1 * | 3/2005 | Dube et al. .................. 709/226 |
| 2005/0078606 A1 | 4/2005 | Bernstein et al. | |
| 2005/0141565 A1 * | 6/2005 | Forest et al. ................. 370/503 |
| 2006/0198312 A1 | 9/2006 | Schondelmayer et al. | |
| 2006/0198318 A1 | 9/2006 | Schondelmayer et al. | |
| 2006/0198319 A1 | 9/2006 | Schondelmayer et al. | |
| 2006/0200711 A1 | 9/2006 | Schondelmayer et al. | |

OTHER PUBLICATIONS

U.S. Appl. No. 10/218,343, filed Aug. 13, 2002, Farley et al.
U.S. Appl. No. 10/228,212, filed Aug. 26, 2002, Dubé et al.
U.S. Appl. No. 10/307,272, filed Nov. 27, 2002, Bain et al.

(Continued)

*Primary Examiner*—Carol S Tsai
(74) *Attorney, Agent, or Firm*—Workman Nydegger

(57) ABSTRACT

A networking system is provided. The networking system may include a diagnostic module. The diagnostic module may perform any of a variety of network diagnostic functions. A diagnostic module may include an oscillator module. The oscillator module may be configured to provide a variety of clock signals to support a variety of network protocols and/or data rates.

37 Claims, 7 Drawing Sheets

OTHER PUBLICATIONS

U.S. Appl. No. 10/424,363, filed Apr. 25, 2003, Bain et al.
U.S. Appl. No. 10/424,364, filed Apr. 25, 2003, Bain et al.
U.S. Appl. No. 10/424,361, filed Apr. 25, 2003, Foster et al.
U.S. Appl. No. 10/448,670, filed May 30, 2003, Cicchetti et al.
U.S. Appl. No. 10/448,827, filed May 30, 2003, Garcia et al.
U.S. Appl. No. 10/764,218, filed Jan. 23, 2004, Durham et al.
U.S. Appl. No. 11/433,236, May 12, 2006, Cuni et al.
Integrated Circuit Systems, Inc.; *ICS8431-21 Datasheet*; Sep. 30, 2003; 16 pages.
Integrated Circuit Systems, Inc.; *ICS8431-21 Datasheet*; Jul. 30, 2004; 16 pages.
Integrated Circuit Systems, Inc.; *ICS8431-21 Datasheet*; Apr. 27, 2005; 17 pages.
Integrated Circuit Systems, Inc.; *ICS8431-11 Datasheet*; Jun. 20, 2003; 17 pages.
Integrated Circuit Systems, Inc.; *ICS8431-11 Datasheet*; Oct. 21, 2004; 17 pages.
Integrated Circuit Systems, Inc.; *ICS84314 Datasheet*; Feb. 4, 2004; 18 pages.
Integrated Circuit Systems, Inc.; *ICS84314 Datasheet*; Nov. 5, 2004; 18 pages.
Finisar Corporation; *SAN QoS ProbeFC Datasheet*; Apr. 25, 2002; 2 pages.
Finisar Corporation; *Finisar Introduces New Network Analyzer Platform Solutions to Advance Fibre Channel and SAN Development*; Apr. 6, 2004; 2 pages.
Finisar Corporation; *Xgig Analyzer Blades Hardware Guide*; Apr. 8, 2004; 22 pages.
Finisar Corporation; *Xgig Analyzer User's Guide: Fiber Channel, Infiniband, Gig-E*; Apr. 8, 2004; 124 pages.
Finisar Corporation; *Xgig Analyzer 1.6*; http://web.archive.org/web/20040619224501/www.finisar.com/nt/documents/Xgig1.6Final_000.pdf; Jun. 19, 2004; 4 pages.
Finisar Corporation; *Analyze*; URL: http://web.archive.org/web/20040816074938/www.finisar.com/nt/xgig.php; Aug. 16, 2004; 1 page.
*Internet Archive, Frequently Asked Questions*; http://www.archive.org/about/faqs.php; downloaded from the Internet on Nov. 9, 2006; 48 pages.

\* cited by examiner

| Protocol | Signal 112A | Input(s) 160 | | Signal 106A | Signal 106B | Input(s) 162 | | Signal 106C |
|---|---|---|---|---|---|---|---|---|
| | | M8 - M0 | DIV_SEL | | | CNFG | SPEED | |
| SAS/SATA | 16MHz | 101000000 | 0 | 160 MHz | 20 MHz | 00 | 0 | 1.5 GHz |
| SAS/SATA | 16MHz | 101000000 | 0 | 160 MHz | 20 MHz | 00 | 1 | 3.0 GHz |
| Gigabit Ethernet | 16MHz | 110010000 | 0 | 200 MHz | 25 MHz | 10 | 0 | 1.25 GHz |
| Gigabit Ethernet | 16MHz | 110010000 | 0 | 200 MHz | 25 MHz | 10 | 1 | 2.5 GHz |
| Fibre Channel | 16MHz | 101010100 | 0 | 170 MHz | 21.25 MHz | 10 | 0 | 1.0625 GHz |
| Fibre Channel | 16MHz | 101010100 | 0 | 170 MHz | 21.25 MHz | 10 | 1 | 2.125 GHz |

FIGURE 6

NETWORK DIAGNOSTIC SYSTEM WITH PROGRAMMABLE OSCILLATOR

CROSS-REFERENCE TO RELATED APPLICATIONS

This application claims priority to and the benefit of U.S. provisional patent application Ser. No. 60/649,002, filed Feb. 1, 2005 and entitled MULTIFUNCTION NETWORK DIAGNOSTIC SYSTEM WITH PROGRAMMABLE OSCILLATOR, which is hereby incorporated by reference herein.

BACKGROUND OF THE INVENTION

1. Field of the Invention

The present invention relates generally to generating signals in networking systems. More particularly, embodiments of the invention relate generally to generating clock signals for testing high speed data transmission systems and components.

2. Background Technology

Computer and data communications networks continue to proliferate due to declining costs, increasing performance of computer and networking equipment, and increasing demand for communication bandwidth. As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds.

Each protocol typically supports various data rates or transmission speeds. With each increase in a data rate, a protocol typically will support the new data rate, while continuing to support the slower, prior data rates. This permits networks to support a variety of components operating at a variety of data rates. Not only do data rates differ within a protocol, but different protocols often provide different data rates. Accordingly, a network may include a variety of protocols that may each support a variety of data rates.

To provide a clock signal for a diagnostic system that supports these data rates, a conventional approach is to include a large number of oscillators that provide a large number of needed frequencies. As the number of oscillators increases, noise in the network increases. The resulting noise can have an adverse effect on the network itself as well as the ability of diagnostic equipment to test and monitor the network.

SUMMARY

A need therefore exists for systems and methods that reduce the above-described disadvantages and problems and/or other disadvantages and problems.

In one embodiment, a networking system is provided. The network system may comprise a network, a network diagnostic or testing system, or other similar systems.

In one embodiment, the networking system may include at least one diagnostic module. The diagnostic module may perform any combination of a variety of network diagnostic functions. Examples of some network diagnostic functions may include a bit error rate tester network diagnostic function, a generator network diagnostic function, a jammer network diagnostic function, a protocol analyzer network diagnostic function, and a monitor network diagnostic function. The diagnostic module may perform network diagnostic functions using network messages received via any combination of a variety of serial protocols, physical layer protocols, and other network protocols. The diagnostic module may be configured to perform network diagnostic functions at or about the line speed of a network from which it receives network messages. However, the diagnostic module may be configured to perform network diagnostic functions at higher or lower speeds—depending on the particular configuration. The diagnostic module may be embodied in any of a variety of systems, such as, a printed circuit board, a blade, a chassis computing system, an appliance, and other similar systems.

In one embodiment, the diagnostic module may include an oscillator module. Advantageously, the oscillator module may be configured to provide a variety of clock signals. In one embodiment, the oscillator module generates a variety of clock signals with different frequencies using a single oscillator. Using a single oscillator reduces the noise that would otherwise be present in systems using multiple oscillators to generate the necessary frequencies.

In a preferred embodiment, the oscillator module may include at least one oscillator and at least one frequency module. The frequency module preferably may be configured to generate a signal having a desired frequency from a source signal having another frequency. The frequency module may multiply the frequency of the source signal, divide the frequency of the source signal, perform other suitable operations on the frequency of the source signal, or any suitable combination thereof. The frequency module may use any suitable number of operands to perform any suitable combination of operations. The operands used by the frequency module may be fixed, may be loaded into the frequency module, or any suitable combination thereof.

For purposes of summarizing, some aspects, advantages, and novel features have been described. Of course, it is to be understood that not necessarily all such aspects, advantages, or features will be embodied in any particular embodiment of the invention. Further, embodiments of the invention may comprise aspects, advantages, or features other than those that have been described. Some aspects, advantages, or features of embodiments of the invention may become more fully apparent from the following description and appended claims or may be learned by the practice of embodiments of the invention as set forth in this disclosure.

BRIEF DESCRIPTION OF THE DRAWINGS

To further clarify the above and other advantages and features of embodiments of the present invention, a more particular description of invention will be rendered by reference to specific embodiments thereof which are illustrated in the appended drawings. It is appreciated that these drawings depict only typical embodiments of the invention and are therefore not to be considered limiting of its scope. Embodiments of the invention will be described and explained with additional specificity and detail through the use of the accompanying drawings in which:

FIG. 6 is a chart illustrating exemplary embodiments of signals and inputs that may be used with an embodiment of the programmable oscillator module shown in FIG. 4.

DETAILED DESCRIPTION OF THE PREFERRED EMBODIMENTS

Diagnostic systems or equipment can be configured to test, analyze, and monitor networks and network equipment. Diagnostic systems or equipment can include, but are not limited to, protocol analyzers, generators, jammers, bit error rate testers, and the like. One of the problems faced by diagnostic systems is related to the multitude of data rates associated with the various protocols. Embodiments of the invention relate to systems and methods for generating multiple data rates. Embodiments of the invention can be included in diagnostic systems or equipment and thus enhance the ability of a diagnostic system to function with multiple protocols and data rates. Further, embodiments of the invention are programmable, which may allow existing hardware to accommodate new data rates without replacing or upgrading the hardware. Further, noise associated with conventional oscillators may be reduced.

Exemplary Networking System

Figure 1A:
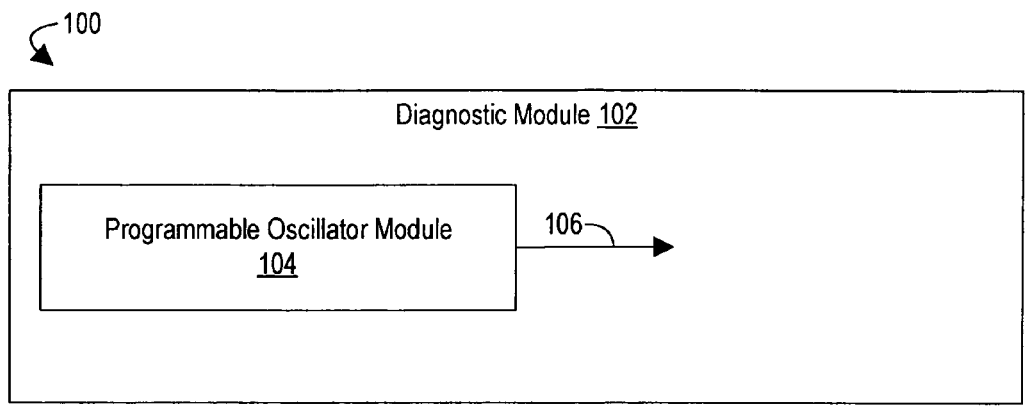
FIG. 1A is a block diagram of a networking system, which may include a diagnostic module, according to an exemplary embodiment of the invention.

FIG. 1A is a block diagram of a networking system 100, according to an exemplary embodiment of the invention. The networking system 100 may include one or more nodes (not shown). As used herein, a "node" includes, but is not limited to, a server or host; a client or storage device; a switch; a hub; a router; all or a portion of a SAN fabric; a diagnostic device; and any device that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" includes, but is not limited to, a packet; a datagram; a frame; a data frame; a command frame; an ordered set; any unit of data capable of being routed (or otherwise transmitted) through a computer network; and the like. In one embodiment, a network message may comprise transmission characters used for data purposes, protocol management purposes, code violation errors, and the like. Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), SAS/SATA, Serial SCSI Architecture ("SSA"), and the like. The data rates or transmission speeds of the various protocols are typically determined by the specific protocol.

Exemplary Diagnostic Module

As shown in FIG. 1A, the networking system 100 may comprise a diagnostic module 102, which is an example of a network diagnostic system, a network testing system, or the like. In one embodiment, the diagnostic module 102 may comprise one or more hardware modules, one or more software modules, or both. The diagnostic module 102 may receive one or more network messages from a node, send one or more network messages to a node, or both.

The diagnostic module 102 may perform variety of network diagnostic functions. In performing some of these diagnostic functions, the diagnostic module 102 may be configured to be passive to network traffic comprising one or more network messages or other data. Accordingly, the diagnostic module may passively receive at least some of the network traffic, and may passively transmit some or all of the received network traffic. In performing other diagnostic functions, the diagnostic module 102 may be configured to alter some or all of the network traffic and/or generate network traffic.

Multi-Function Diagnostic Modules

As mentioned above, the diagnostic module 102 may perform variety of network diagnostic functions. The diagnostic module 102 may be configured to function as any combination of: a bit error rate tester (BERT), a protocol analyzer, a generator, a jammer, a monitor, and any other appropriate network diagnostic device.

In some embodiments, the diagnostic module 102 may function as a bit error rate tester. The bit error rate tester may generate and/or transmit an initial version of a bit sequence via one or more communication paths. If desired, the initial version may be user selected. The bit error rate tester may also receive a received version of the bit sequence via the communication path. The bit error rate tester can compare the received version with the original version to generate statistics that may include, but are not limited to, the total number of errors (such as, bits that did not match or lost bits), a bit error rate, and the like. In one embodiment, a bit error rate tester network diagnostic function may comprise generating an initial version of a bit sequence; transmitting the initial version of the bit sequence over at least a portion of network; receiving a version of the transmitted bit sequence; and comparing at least a portion of the initial version of the bit sequence with at least a portion of the received version of the bit sequence.

In some embodiments, the diagnostic module 102 may function as a protocol analyzer (or network analyzer), which may be used to capture a bit sequence for further analysis. The further analysis may comprise, for example, diagnose data transmission faults, data transmission errors, performance errors (known generally as problem conditions), and/or other conditions. In one embodiment, a protocol analyzer network diagnostic function may comprise receiving a first bit sequence comprising at least one network message; comparing at least a portion of the first bit sequence with a second bit sequence; and in response to the comparison, executing a capture of a third bit sequence comprising at least a portion of a network message.

Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety.

In some embodiments, the diagnostic module 102 may function as a generator. The generator may generate and/or transmit a bit sequence via one or more communication paths. Typically, the bit sequence comprises one or more network messages, such as, packets, frames, or other protocol-adapted network messages. The one or more network messages may comprise simulated network traffic between a plurality of nodes on a network. Advantageously, a network administrator may evaluate how the plurality of nodes (and/or other nodes on the network) respond to the simulated network traffic. Thus, the network administrator may be able to identify performance deviations and take appropriate measures to help avoid future performance deviations. In one embodiment, a generator network diagnostic function may comprise generating a bit sequence; and transmitting the bit sequence over at least a portion of network; wherein the bit sequence comprises a plurality of network messages simulating traffic between at least two nodes on the network.

In some embodiments, the diagnostic module 102 may function as a jammer. The jammer may receive, generate, and/or transmit one or more bit sequences via one or more communication paths. Typically, the bit sequences comprise one or more network messages (such as, packets, frames, or other protocol-adapted network messages) comprising network traffic between a plurality of nodes on a network. The jammer may be configured as an inline component of the network such that the jammer may receive and retransmit (or otherwise forward) one or more network messages.

Prior to retransmitting the received network messages, the jammer may selectively alter at least a portion of the network traffic, which alterations may introduce protocol errors or other types of errors. Thus, by altering at least a portion of the network traffic, jammer may generate traffic, which traffic may be used to test a network. In one embodiment, a jammer network diagnostic function may comprise receiving a bit sequence comprising at least one network message; altering at least a portion of the bit sequence; and transmitting at least a portion of the altered bit sequence.

In some embodiments, the diagnostic module 102 may function as a monitor, which may be used to derive statistics from one or more network messages having particular characteristics, one or more conversations having particular characteristics, and the like. In one embodiment, a monitor network diagnostic function may comprise receiving a first bit sequence comprising at least one network message; comparing at least a portion of the first bit sequence with a second bit sequence; and in response to the comparison, generating one or more statistics.

In some embodiments, the diagnostic module may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety. It will be appreciated that the diagnostic module 102 need not be configured to function as a bit error rate tester, protocol analyzer, a generator, a jammer, or a monitor and could, for example, be configured to perform other network diagnostic functions.

Exemplary Diagnostic Module Architecture

FIG. 1A illustrates an exemplary embodiment of architecture that may be used to implement the diagnostic module 102.

As shown in FIG. 1A, the diagnostic module 102 may include an oscillator module 104. The oscillator module 104 may include one or more hardware modules, one or more software modules, or both.

An oscillator module may be programmable. For example, in one embodiment, various software configurations may be loaded into a programmable oscillator module 104, which may use the software configurations to provide any desired clock signal 106. Also, for example, in one embodiment, various inputs (such as control signals, operands or the like) may be received by a programmable oscillator module 104, which may use the inputs to provide any desired clock signal 106. Further, for example, in one embodiment, various operands may be loaded into a programmable oscillator module 104, which may use the inputs to provide any desired clock signal 106.

Advantageously, the clock signal 106 may then be set to any desired frequency, thus permitting the diagnostic module 102 to be compatible with any desired data rate supported by any desired protocol. By way of example and not limitation, the oscillator module 104 may provide a clock signal to support Fiber Channel [1.0625 GHz; 2.125 GHz; 4.25 GHz; 8.5 GHz; (1.0625 GHz)*a where a is any integer greater than 0; and/or other rates], Gigabit Ethernet [1.25 GHz; 2.5 GHz; (1.25 GHz)*b where b is any integer greater than 0; and/or other rates], and SAS/SATA [1.5 GHz; 3.0 GHz; 6.0 GHz; 12.0 GHz; (1.5 GHz)*c where c is any integer greater than 0; and/or other rates].

Figure 1B:
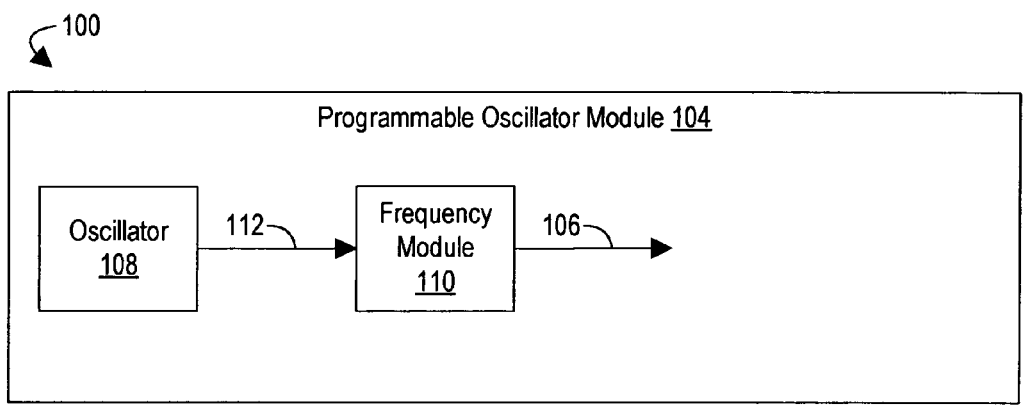
FIG. 1B is a block diagram illustrating an embodiment of a programmable oscillator module that may be used in the diagnostic module shown in FIG. 1A.
Figure 1C:
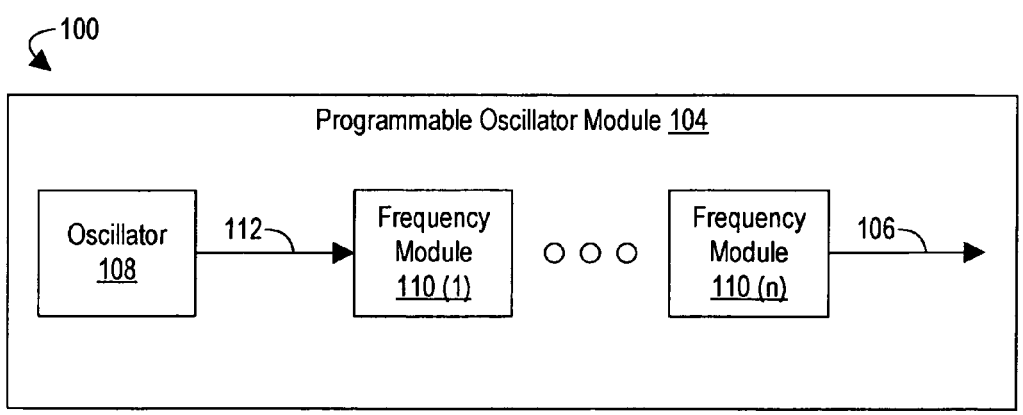
FIG. 1C is a block diagram illustrating an embodiment of a programmable oscillator module that may be used in the diagnostic module shown in FIG. 1A.

FIG. 1B is a block diagram illustrating an embodiment of the oscillator module 104 shown in FIG. 1A. FIG. 1C is a block diagram illustrating another embodiment of the oscillator module 104 shown in FIG. 1A.

As shown in FIG. 1B, the oscillator module 104 may include a source oscillator 108 that may be configured to provide a source signal 112 having a frequency. The oscillator module 104 may also include a frequency module. In one embodiment, a frequency module may be configured to receive a first signal having a first frequency and may use the first signal to generate a second signal having a second frequency. Accordingly, a frequency module 110 may receive the signal 112 and use the signal 112 to generate a desired clock signal 106 having a desired frequency.

As shown in FIG. 1C, the oscillator module 104 may include a source oscillator 108 and a plurality of frequency modules, such as, the frequency modules 110(1) to 110(n). As shown, the plurality of frequency modules may be linked together to provide a desired clock signal 106. For example, the oscillator 108 may be configured to provide a signal 112 having a known frequency, which a first frequency module may receive and use to generate a first generated signal having a first frequency. A second frequency module may receive the first generated signal and use the first generated signal to generate a second generated signal having a second frequency. As shown in FIG. 1C, two or more such frequency modules may be coupled together to provide a desired clock signal 106.

A frequency module may be programmable. For example, in one embodiment, various software configurations may be loaded into a programmable frequency module 110, which may use the software configurations to provide any desired clock signal 106. Also, for example, in one embodiment, various inputs may be received by a programmable frequency module 110, which may use the inputs to provide any desired clock signal 106. Further, for example, in one embodiment, various operands may be loaded into a programmable frequency module 110, which may use the inputs to provide any desired clock signal 106.

In greater detail, in one embodiment, a frequency module may include one or more configurable operands that may be used to manipulate a first signal having a first frequency into a second signal having second frequency. For example, a frequency module may be configured to receive one or more operands that may be used to manipulate a first signal having a first frequency into a second signal having second frequency. In one embodiment, a frequency module may include one or more fixed operands that may be used to manipulate a first signal having a first frequency into a second signal having second frequency. The configurable operands and/or the fixed operands may be used for any suitable operation, including but not limited to, division or multiplication. Accordingly, the frequency module may multiply a frequency by a given operand and/or may divide a frequency by a given operand.

As shown above, a frequency module may include one or more configurable operands and/or fixed operands. In one embodiment, the configurable operands and/or the fixed operands may be selectable via, for example, one or more control signals or other types of inputs—thus allowing the frequency module to be programmed to help provide a desired clock signal.

Figure 2:
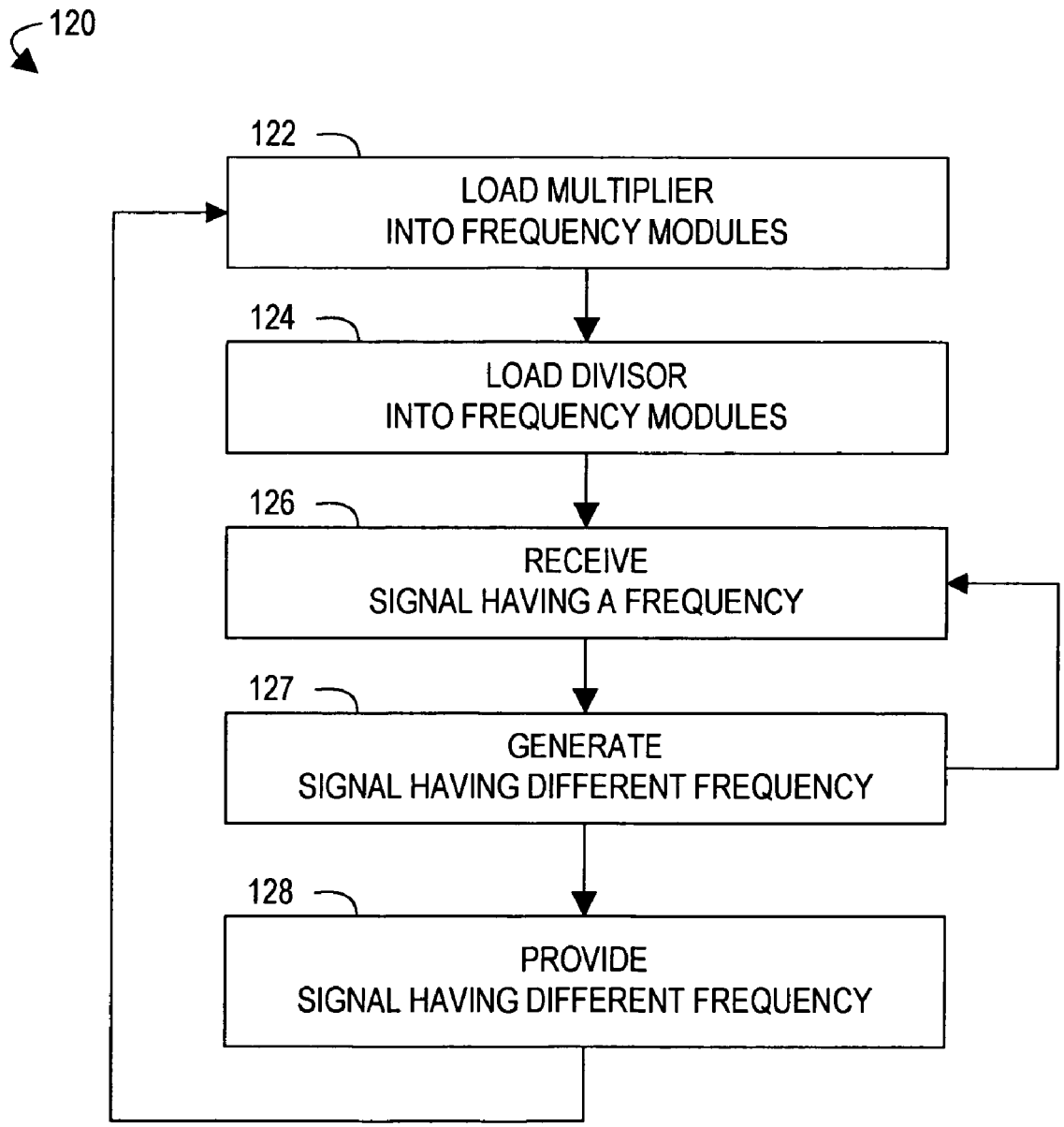
FIG. 2 is a flow chart illustrating an embodiment of a method for generating a clock signal in the diagnostic module shown in FIG. 1A.

FIG. 2 is a flow chart illustrating an embodiment of a method 120 that may be used to provide a clock signal. As mentioned above, a frequency module may receive one or more operands, which may be used for division, multiplication, or any other suitable operations. Preferably, the operands can be loaded into the oscillator module 104 at any time. Consequently, the frequency modules 110(1)-110(n) may be programmable. This enables the frequency generated by the oscillator 108 to be converted into any desired frequency. Advantageously, the oscillator module 104 can generate clock signals to support the data rate or transmission speed of multiple protocols—even when using a single oscillator 108. By using a single source oscillator, the oscillator module 104 may reduce noise, such as the noise that can be generated when multiple oscillators are used. It will be appreciated, however, that an oscillator module (such as the oscillator module 104) may include more than one source oscillator (such as the oscillator 108) and that an oscillator module need not include any source oscillator. For example, a frequency module of an oscillator module may receive a source signal (such as the signal 112) from any suitable source, including oscillators distinct from the oscillator module.

At a block 122, at least one multiplier operand may be loaded into one or more frequency modules (such as, the frequency module 110 in FIG. 1B). Also, at a block 124, at least one divisor operand may be loaded into one or more frequency modules. Accordingly, one or more multiplier operands, one or more divisor operands, one or more other operands, or any suitable combination thereof may be loaded into frequency modules at the blocks 122, 124.

At a block 126, the frequency module may receive a signal (for example, from an oscillator or another frequency module) and may use at least one of the multiplier operands, at least one of the divisor operands, or both to generate another signal having a different frequency at the block 127.

As shown in FIG. 2, the method 120 may return to the block 126, where yet another frequency module may receive the generated signal and may use at least one of the multiplier operands, at least one of the divisor operands, or both to generate yet another signal having a different frequency at the block 127. If desired, the blocks 126, 127 may be repeated any number of times to generate a signal having a desired frequency. But the blocks 126, 127 need not be repeated to generate a signal having a desired frequency.

When the signal generated at the block 127 has a desired frequency, the frequency module may, at a block 128, provide the generated signal to another frequency module and/or to any subcomponent of the diagnostic module 102. Advantageously, the signal provided at the block 128 may be a clock signal.

After providing the signal at the block 128, it may be desirable to provide a new signal having frequency that is different from the one provided at the block 128. For example, the signal generated at the block 128 may be a first clock signal supporting a first data rate and the new signal may be a second clock signal supporting a second data rate. In addition, the first clock signal may support a first network protocol, and the second clock signal may support a second network protocol. Accordingly, some or all of the method 120 may be repeated to provide the new signal.

In some embodiments, the networking system 100 and the diagnostic module 102 may have features described and illustrated in U.S. patent application Ser. No. 11/345,202, entitled NETWORK DIAGNOSTIC SYSTEMS AND METHODS FOR PROCESSING NETWORK MESSAGES and filed on the same date as this application; U.S. patent application Ser. No. 11/344,883, entitled NETWORK DIAGNOSTIC SYSTEMS AND METHODS FOR STATISTICAL TRIGGERING and filed on the same date as this application; U.S. patent application Ser. No. 11/344,892, entitled NETWORK DIAGNOSTIC SYSTEMS AND METHODS FOR ALTERING THE FORMAT AND BANDWIDTH OF NETWORK MESSAGES and filed on the same date as this application; and U.S. patent application Ser. No. 11/344,893, entitled NETWORK DIAGNOSTIC SYSTEMS AND METHODS FOR AGGREGATED LINKS and filed on the same date as this application; the disclosures of each of which are hereby incorporated by reference herein in their entireties.

Exemplary Networking Systems

It will be appreciated that the diagnostic module 102 may be used to implement a variety of networking systems, networking diagnostic systems, and the like and that the oscillator module 104 can be programmed to generate any appropriate data rate. FIGS. 3A-3D illustrate various embodiments of the networking system 100 shown in FIG. 1.

Figure 3A:
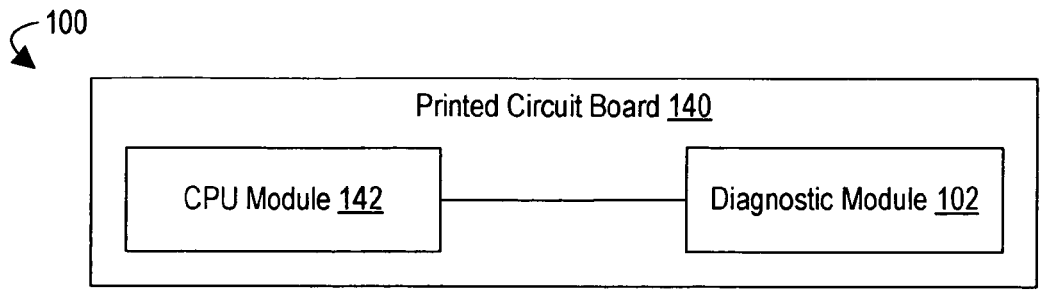
FIG. 3A is a block diagram of an embodiment of the networking system shown in FIG. 1, according to an embodiment of the invention.

As shown in FIG. 3A, the networking system 100 may include a printed circuit board 140, which may include a CPU module 142 and the diagnostic module 102. The diagnostic module 102 may be coupled to the CPU module 142 using a PCI interface or any other suitable interface. Thus, in one embodiment, the diagnostic module 102 send the statistics or any other suitable network diagnostic data to the CPU Module 142 via a suitable interface. The printed circuit board 140 may include one or more CPU modules and may include one or more diagnostic modules, depending upon the particular configuration.

Figure 3B:
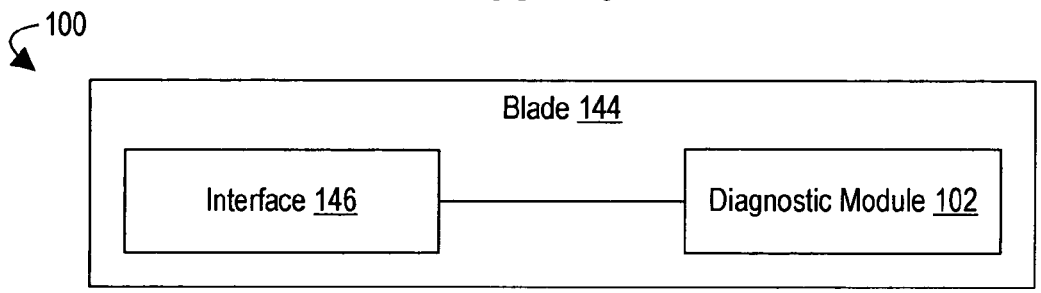
FIG. 3B is a block diagram of an embodiment of the networking system shown in FIG. 1A, according to an embodiment of the invention.

As shown in FIG. 3B, the networking system 100 may include a blade 144, which may comprise a printed circuit board. The blade 144 may include an interface 146 and the diagnostic module 102. The diagnostic module 102 may be coupled to the interface 146.

Figure 3C:
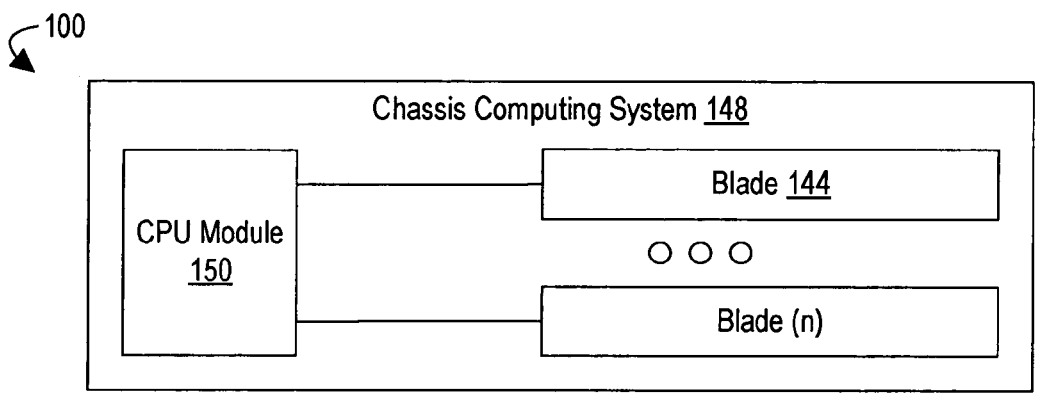
FIG. 3C is a block diagram of an embodiment of the networking system shown in FIG. 1A, according to an embodiment of the invention.

As shown in FIG. 3C, a chassis computing system 148 may include one or more CPU modules (such as, a CPU module 150), which may be adapted to interface with one, two, or more blades or other printed circuit boards. For example, a blade may have an interface (such as, the interface 146) though which the diagnostic module 102 may send network diagnostic data to the CPU module. The chassis computer system 148 may be adapted to receive one or more printed circuit boards or blades.

A CPU module, such as, the CPU modules 142 and 150, may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A. HIGH SPEED COMMUNICATIONS NETWORK and filed Nov. 27, 2002, which is hereby incorporated by reference herein in its entirety.

Figure 3D:
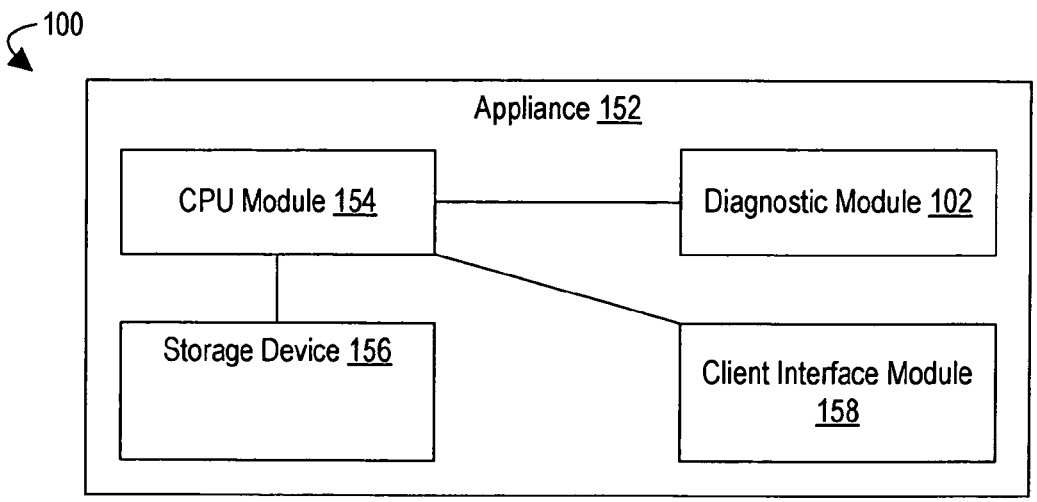
FIG. 3D is a block diagram of an embodiment of the networking system shown in FIG. 1A, according to an embodiment of the invention.

As shown in FIG. 3D, an appliance (such as, an appliance 152) may comprise one or more diagnostic modules (such as, the diagnostic module 102). Depending on the particular configuration, the appliance 152 may include any suitable combination of one or more CPU modules (such as, a CPU module 154) and one or more diagnostic modules. In one embodiment, an appliance may include and/or be in communication with one or more storage devices (such as, a storage device 156), which may advantageously be used for storing any suitable diagnostic data, statistics, and the like. In one embodiment, an appliance may include and/or be in communication with one or more client interface modules (such as, a client interface module 158), which may advantageously be used for displaying information to a user, receiving user input from a client software program, sending information to a client software program, or both. The appliance may also include and/or be in communication with one or more display devices (such as, a monitor) adapted to display information, one or more user input devices (such as, a keyboard, a mouse, a touch screen, and the like) adapted to receive user input, or both.

Exemplary Oscillator Module & Method

Figure 4:
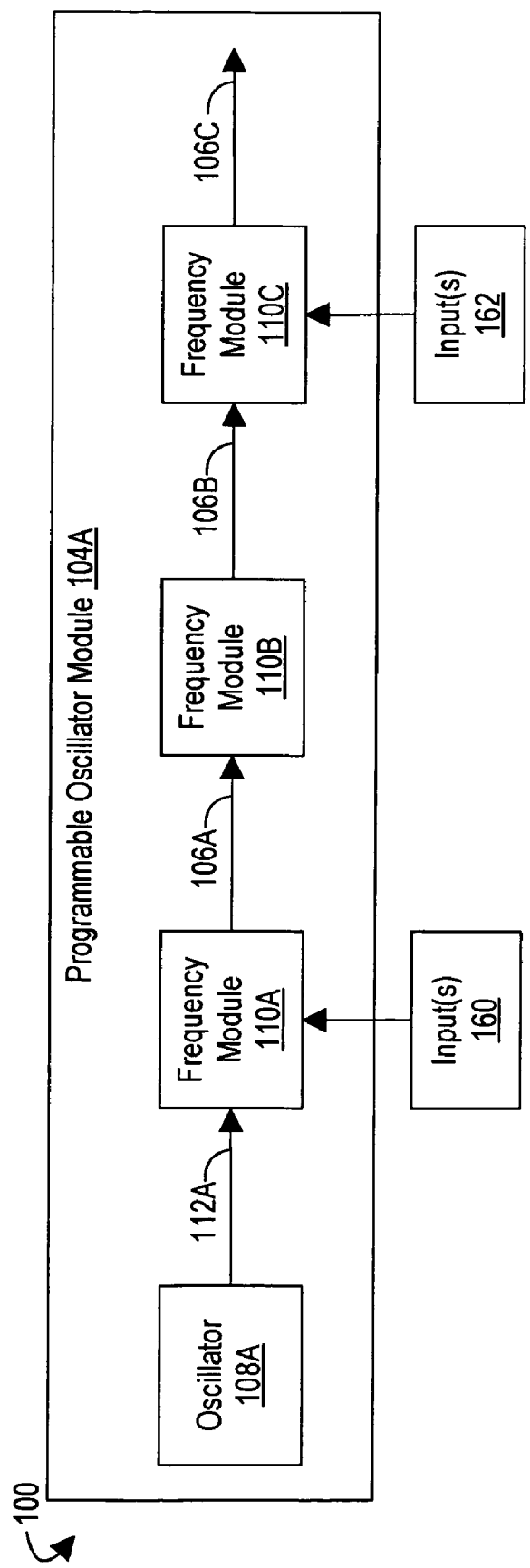
FIG. 4 is a block diagram illustrating an embodiment of a programmable oscillator module that may be used in the diagnostic module shown in FIG. 1A.

FIG. 4 is a block diagram illustrating an embodiment of a programmable oscillator module 104A that may be used in the diagnostic module shown in FIG. 1A. As shown in FIG. 4, the oscillator module 104A may include a source oscillator 108A, a frequency module 110A, a frequency module 10B, and a frequency module 110C.

The oscillator 108A and the frequency modules 110A, 110B, 110C may help the oscillator module 104A provide a clock signal. The oscillator 108A may be configured to provide a source signal 112A having a first frequency. The frequency module 110A may receive and use the signal 112A to generate a first generated signal 106A having a second frequency. The frequency module 110B may receive and use the signal 106A to generate a second generated signal 106B having a third frequency. The frequency module 110C may receive and use the signal 106B to generate a third generated signal 106C having a fourth frequency. To help the oscillator module 104A provide a clock signal, some or all of the frequency modules 110A, 110B, 110C may receive one or more inputs (such as inputs 160, 162), which may be used to program the frequency modules.

Advantageously, the signal 106C may be a clock signal that a diagnostic module may use to perform one or more network diagnostic functions. The frequency of the signal 106C may be any desired frequency to permit the diagnostic module to be compatible with any desired data rate supported by any desired protocol.

Figure 5:
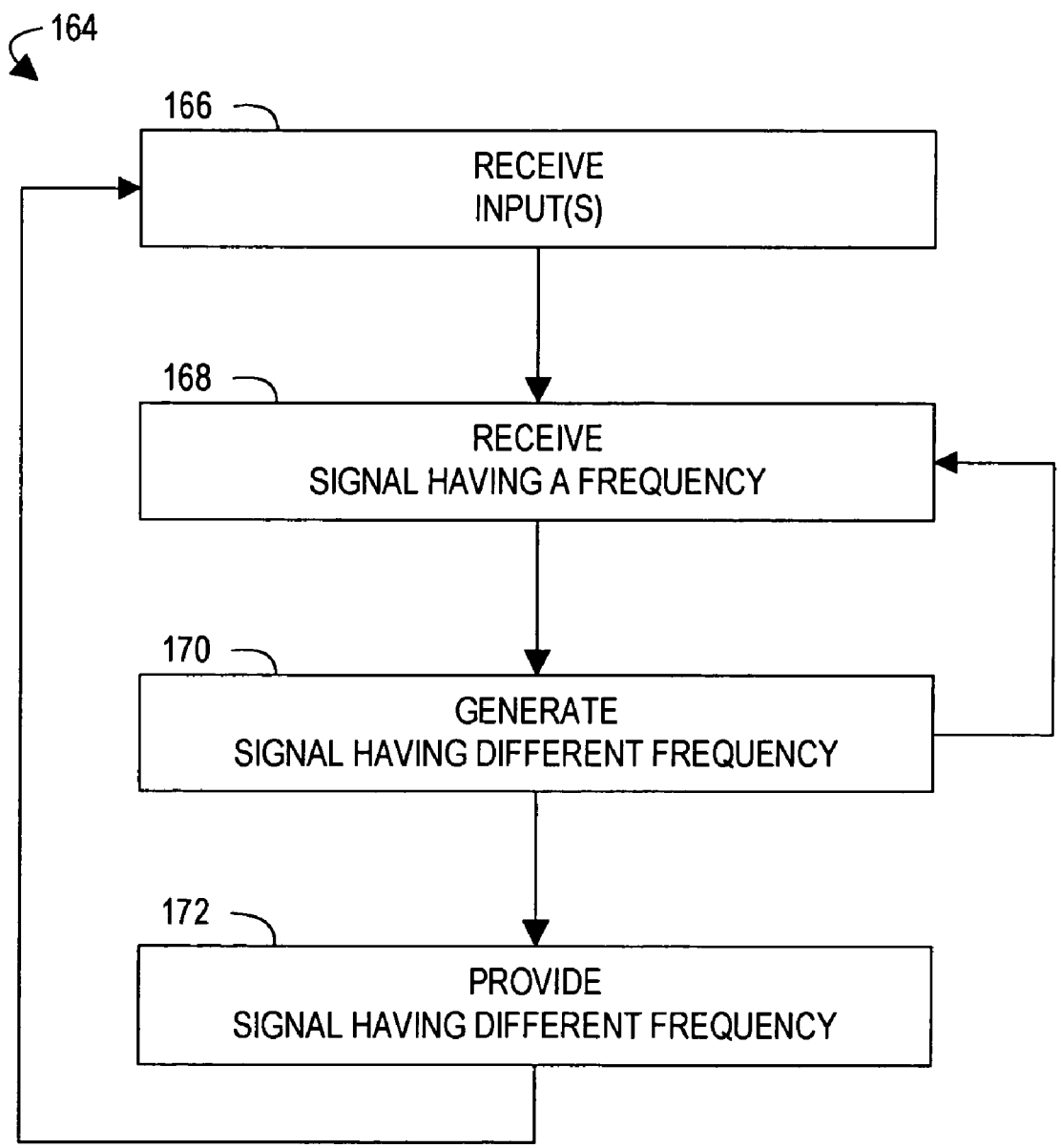
FIG. 5 is a flow chart illustrating an embodiment of a method for generating a signal.

FIG. 5 is a flow chart illustrating an embodiment of a method 164 for generating a signal, such as the signal 106C. At a block 166, a frequency module may receive one or more inputs (such as control signals, operands or the like). For example, as shown in FIG. 4, the frequency module 110A may receive one or more inputs 160, and the frequency module 110A may receive one or more inputs 162.

As shown in FIG. 5, a frequency module may—at a block 168—receive a first signal having a first frequency and may—at a block 170—use the first frequency to generate a second signal having a second frequency different from first frequency. The blocks 168, 170 may be repeated any number of times to generate a signal having a desired frequency. But the blocks 168, 170 need not be repeated to generate a signal having a desired frequency. It will be appreciated that, at the block 168, a frequency module may receive the first signal from an oscillator, another frequency module or any other source. In greater detail, as shown in FIG. 4, the frequency module 110A may receive and use the signal 112A to generate the signal 106A; the frequency module 110B may receive and use the signal 106A to generate the signal 106B; and the frequency module 10C may receive and use the signal 106B to generate the signal 106C.

In some embodiments, a frequency module may use the inputs (which were received at the block 166) to determine how to use the first frequency to generate the second frequency at the block 170. For example, in one embodiment, the frequency module 110A may comprise a ICS8431-21 (which is commercially available from Integrated Circuit Systems Inc., 2435 Boulevard of the Generals, Norristown, Pa. 19403, USA); and the frequency module 110C (FIG. 4) may comprise a Marvell 88SA8151 IC (which is commercially available from Marvell Semiconductor, Inc., 5488 Marvell Lane, Santa Clara, Calif. 95054, USA). The ICS8431-21 may receive one or more inputs (including 9 bits labeled "M8" to "M0" and a bit labeled "DIV_SEL"), which the ICS8431-21 may use in determining how to use a received signal having a first frequency to generate a second signal having a different frequency. The Marvell 88SA8151 IC may receive one or more inputs (including two bits labeled "CNFG" and a bit labeled "SPEED"), which the Marvell 88SA8151 IC may use in determining how to use a received signal having a first frequency to generate a second signal having a different frequency. Thus, the ICS8431-21 and the Marvell 88SA8151 IC may be programmable.

As shown in FIG. 5, at a block 172, a frequency module may provide the second signal (which was generated at the block 170) to another frequency module and/or any subcomponent of the diagnostic module 102. Advantageously, the second signal may be a clock signal.

After providing the signal at the block 172, it may be desirable to provide a new signal having frequency that is different from the one provided at the block 172. For example, the signal generated at the block 172 may be a first clock signal supporting a first data rate and the new signal may be a second clock signal supporting a second data rate. In addition, the first clock signal may support a first network protocol, and the second clock signal may support a second network protocol. Accordingly, some or all of the method 164 may be repeated to provide the new signal.

FIG. 6 includes a chart 174 illustrating exemplary embodiments of signals and inputs that may be used with an embodiment of the oscillator module 104A (FIG. 4) in which the frequency module 110A comprises an ICS8431-21 and the frequency module 110C comprises a Marvell 88SA8151 IC. The chart includes rows 176, 178, 180, 182, 184, 186 for various exemplary protocols and associated clock signals.

As shown in FIGS. 4 and 6, the oscillator 108A may provide a signal 112A. The frequency of the signal 112A may be used to generate at least one clock signal for at least one protocol. Preferably, the frequency of the signal 112A may be used to generate one or more clock signals for a plurality of protocols. For example, as shown in the chart 174, the frequency of the signal 112A may be used to generate clock signals for SAS/SATA (1.5 GHz, 3.0 GHz), Gigabit Ethernet (1.25 GHz, 2.5 GHz), and Fibre Channel (1.0625 GHz, 2.125 GHz). Because the frequency of single signal 112A of a single oscillator 108A may be used to generate one or more clock signals for a plurality of protocols, the oscillator module 104A may reduce noise, such as the noise that can be generated when multiple oscillators are used.

In a configuration shown in the row 176 of the chart 174 (FIG. 6), the frequency module 110A receives a signal 112A having a frequency of 16 MHz. Based upon the values of the inputs 160 in the row 176, the frequency module 110A uses the frequency of the signal 112A to generate a signal 106A having a frequency of 160 Mhz. The frequency module 110B receives the signal 106A and uses the frequency of the signal 106A to generate a signal 106B having a frequency of 20 MHz, which is one-eighth of the frequency of the signal 106A. The frequency module 10C receives the signal 106B. Based upon the values of the inputs 162 in the row 176, the frequency module 110C uses the frequency of the signal 106B to generate a signal 106C having a frequency of 1.5 GHz, which is seventy-five times the frequency of the signal 106B.

In a configuration shown in the row 178 of the chart 174 (FIG. 6), the frequency module 110A receives a signal 112A having a frequency of 16 MHz. Based upon the values of the inputs 160 in the row 178, the frequency module 110A uses the frequency of the signal 112A to generate a signal 106A having a frequency of 160 Mhz. The frequency module 110B receives the signal 106A and uses the frequency of the signal 106A to generate a signal 106B having a frequency of 20 MHz, which is one-eighth of the frequency of the signal 106A. The frequency module 110C receives the signal 106B. Based upon the values of the inputs 162 in the row 178, the frequency module 110C uses the frequency of the signal 106B to generate a signal 106C having a frequency of 3.0 GHz, which is one-hundred-fifty times the frequency of the signal 106B.

In a configuration shown in the row 180 of the chart 174 (FIG. 6), the frequency module 110A receives a signal 112A having a frequency of 16 MHz. Based upon the values of the inputs 160 in the row 180, the frequency module 110A uses the frequency of the signal 112A to generate a signal 106A having a frequency of 200 Mhz. The frequency module 110B receives the signal 106A and uses the frequency of the signal 106A to generate a signal 106B having a frequency of 25 MHz, which is one-eighth of the frequency of the signal 106A. The frequency module 110C receives the signal 106B. Based upon the values of the inputs 162 in the row 180, the frequency module 110C uses the frequency of the signal 106B to generate a signal 106C having a frequency of 1.25 GHz, which is fifty times the frequency of the signal 106B.

In a configuration shown in the row 182 of the chart 174 (FIG. 6), the frequency module 110A receives a signal 112A having a frequency of 16 MHz. Based upon the values of the inputs 160 in the row 182, the frequency module 110A uses the frequency of the signal 112A to generate a signal 106A having a frequency of 200 Mhz. The frequency module 110B receives the signal 106A and uses the frequency of the signal 106A to generate a signal 106B having a frequency of 25 MHz, which is one-eighth of the frequency of the signal 106A. The frequency module 110C receives the signal 106B. Based upon the values of the inputs 162 in the row 182, the frequency module 110C uses the frequency of the signal 106B to generate a signal 106C having a frequency of 2.5 GHz, which is one-hundred times the frequency of the signal 106B.

In a configuration shown in the row 184 of the chart 174 (FIG. 6), the frequency module 110A receives a signal 112A having a frequency of 16 MHz. Based upon the values of the inputs 160 in the row 184, the frequency module 110A uses the frequency of the signal 112A to generate a signal 106A having a frequency of 170 Mhz. The frequency module 110B receives the signal 106A and uses the frequency of the signal 106A to generate a signal 106B having a frequency of 21.25 MHz, which is one-eighth of the frequency of the signal 106A. The frequency module 10C receives the signal 106B. Based upon the values of the inputs 162 in the row 184, the frequency module 110C uses the frequency of the signal 106B to generate a signal 106C having a frequency of 1.0625 GHz, which is fifty times the frequency of the signal 106B.

In a configuration shown in the row 186 of the chart 174 (FIG. 6), the frequency module 110A receives a signal 112A having a frequency of 16 MHz. Based upon the values of the inputs 160 in the row 186, the frequency module 110A uses the frequency of the signal 112A to generate a signal 106A having a frequency of 170 Mhz. The frequency module 110B receives the signal 106A and uses the frequency of the signal 106A to generate a signal 106B having a frequency of 21.25 MHz, which is one-eighth of the frequency of the signal 106A. The frequency module 10C receives the signal 106B. Based upon the values of the inputs 162 in the row 186, the frequency module 110C uses the frequency of the signal 106B to generate a signal 106C having a frequency of 2.125 GHz, which is one-hundred times the frequency of the signal 106B.

As illustrated in the configurations shown in rows 176, 178, 180, 182, 184, 186, the frequency module 110B may comprise one or more divider circuits configured to receive a signal 106A having a first frequency and generate a signal 106B having a second frequency that is one-eighth of the first frequency. If desired, the frequency module 110B may be programmable, but the frequency module 110B need not be programmable. Of course, the frequency module 110B may generate signals 106B having greater or lesser frequencies, if desired.

It will be appreciated that the oscillator module 104A does not require a Marvell 88SA8151 IC or an ICS8431-21 and that the frequency modules 110A, 110C may be implemented using other suitable components. It will also be appreciated that the oscillator module 104A does not require the signals and inputs shown in the chart 174 and that other signals and inputs may be used to implement the protocols and frequencies shown in the chart 174. It will also be appreciated that the oscillator module 104A may be used to support protocols and/or frequencies other than those listed in the chart 174. It will be further appreciated that the oscillator module 104A may contain a greater or less number of frequency modules depending, for example, upon the particular configuration of the oscillator module 104A, but the oscillator module 104A does not require any frequency modules.

Exemplary Networking Components

Figure 7:
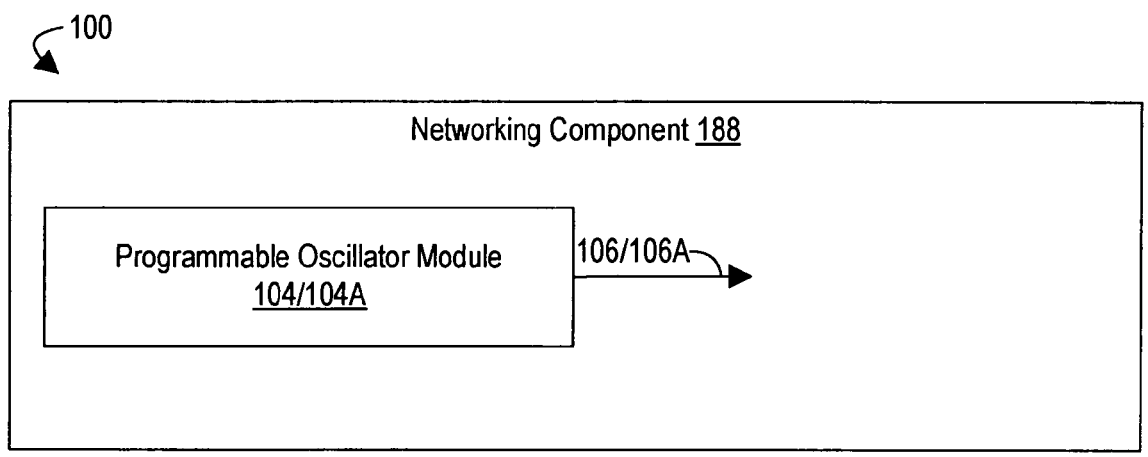
FIG. 7 is a block diagram of an embodiment of a networking component.

The oscillator modules 104, 104A may advantageously be used to provide various clock signals for a variety of networking components, including, but not limited to, nodes, network diagnostic modules, transceivers, other networking components, or any combination thereof. Accordingly, as shown in FIG. 7, any desired networking component 188 may comprise an oscillator module (such as the oscillator modules 104, 104A).

Exemplary Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits "ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network diagnostic system comprising:
a network diagnostic module configured to perform one or more network diagnostic functions, the network diagnostic module comprising an oscillator module, the oscillator module being programmable among at least two configurations, including a first configuration and a second configuration;
in the first configuration, the oscillator module being configured to generate a first clock signal from a source signal, the first clock signal having a frequency, the frequency of the first clock signal being configured to support a data rate of a first network protocol, the source signal having a frequency, the frequency of the first clock signal being different from the frequency of the source signal;
in the second configuration, the oscillator module being configured to generate a second clock signal from the source signal, the second clock signal having a frequency, the frequency of the second clock signal being configured to support a data rate of a second network protocol, the frequency of the second clock signal being different from the frequency of the source signal, the frequency of the second clock signal being different from the frequency of the first clock signal;
wherein the one or more network diagnostic functions comprise any of the following network diagnostic functions;

a bit-error-rate-tester network diagnostic function comprising;
  generating an initial version of a bit sequence;
  transmitting the initial version of the bit sequence over at least a portion of network;
  receiving a version of the transmitted bit sequence; and
  comparing at least a portion of the initial version of the bit sequence with at least a portion of the received version of the bit sequence;
a generator network diagnostic function comprising:
  generating a first bit sequence; and
  transmitting the first bit sequence over at least a portion of network;
  wherein the first bit sequence comprises a plurality of network messages simulating traffic between at least two nodes on the network;
a jammer network diagnostic function comprising:
  receiving a second bit sequence comprising at least one network message;
  altering at least a portion of the second bit sequence; and
  transmitting at least a portion of the altered bit sequence;
a protocol-analyzer network diagnostic function comprising:
  receiving a third bit sequence comprising at least one network message;
  comparing at least a portion of the third bit sequence with a fourth bit sequence; and
  in response to the comparison, executing a capture of a fifth bit sequence comprising at least a portion of a network message; and
a monitor network diagnostic function comprising:
  receiving a sixth bit sequence comprising at least one network message;
  comparing at least a portion of the sixth bit sequence with an seventh bit sequence; and
  in response to the comparison, generating one or more statistics.

2. The network diagnostic system of claim 1, wherein the frequency of the first clock signal is approximately x; wherein x=((1.5 GHz)*a); and wherein a is an integer greater than 0.

3. The network diagnostic system of claim 2, wherein the frequency of the second clock signal is approximately y; wherein y=((1.25 GHz)*b ); and wherein b is an integer greater than 0.

4. The network diagnostic system of claim 3, wherein the first network protocol is SAS/SATA; and wherein the second network protocol is Gigabit Ethernet.

5. The network diagnostic system of claim 1, wherein the frequency of the first clock signal is approximately x; wherein x=((1.0625 GHz)*a); and wherein a is an integer greater than 0.

6. The network diagnostic system of claim 5, wherein the frequency of the second clock signal is approximately y; wherein y=((1.5 GHz)*b ); and wherein b is an integer greater than 0.

7. The network diagnostic system of claim 6, wherein the first network protocol is Fibre Channel; and wherein the second network protocol is SAS/SATA.

8. The network diagnostic system of claim 1, wherein the frequency of the first clock signal is approximately x; wherein x=((1.25 GHz)*a); and wherein a is an integer greater than 0.

9. The network diagnostic system of claim 8, wherein the frequency of the second clock signal is approximately y; wherein y=((1.0625 GHz)*b ); and wherein b is an integer greater than 0.

10. The network diagnostic system of claim 9, wherein the first network protocol is Gigabit Ethernet; and wherein the second network protocol is Fibre Channel.

11. The network diagnostic system of claim 1, further comprising a printed circuit board that includes the network diagnostic module.

12. The network diagnostic system of claim 1, further comprising a chassis computing system that includes at least one blade that includes the network diagnostic module.

13. The network diagnostic system of claim 1, further comprising an appliance that includes the network diagnostic module and a storage device.

14. The network diagnostic system of claim 1, wherein the one or more network diagnostic functions comprise at least the bit error rate tester network diagnostic function.

15. The network diagnostic system of claim 1, wherein the one or more network diagnostic functions comprise at least the generator network diagnostic function.

16. The network diagnostic system of claim 1, wherein the one or more network diagnostic functions comprise at least the jammer network diagnostic function.

17. The network diagnostic system of claim 1, wherein the one or more network diagnostic functions comprise at least the protocol-analyzer network diagnostic function.

18. The network diagnostic system of claim 1, wherein the one or more network diagnostic functions comprise at least the monitor network diagnostic function.

19. The network diagnostic system of claim 1, wherein the one or more network diagnostic functions comprise each of the bit error rate tester network diagnostic function, the generator network diagnostic function, the jammer network diagnostic function, the protocol-analyzer network diagnostic function, and the monitor network diagnostic function.

20. A network diagnostic system comprising: a network diagnostic module configured to perform one or more network diagnostic functions, the network diagnostic module comprising a frequency chip, the frequency chip being programmable among at least four configurations, including a first configuration, a second configuration, a third configuration and a fourth configuration;
  in the first configuration, the frequency chip being configured to generate a first clock signal from a source signal, the first clock signal having a frequency, the frequency of the first clock signal being configured to support a first data rate of a first network protocol, the source signal having a frequency, the frequency of the first clock signal being different from the frequency of the source signal; and
  in the second configuration, the frequency chip being configured to generate a second clock signal from the source signal, the second clock signal having a frequency, the frequency of the second clock signal being configured to support a second data rate of the first network protocol, the frequency of the second clock signal being different from the frequency of the source signal;
  in the third configuration, the frequency chip being configured to generate a third clock signal from a source signal, the third clock signal having a frequency, the frequency of the third clock signal being configured to support a first data rate of a second network protocol, the frequency of the third clock signal being different from the frequency of the source signal;
  in the fourth configuration, the frequency chip being configured to generate a fourth clock signal from the source signal, the fourth clock signal having a frequency, the frequency of the fourth clock signal being configured to support a second data rate of the second network protocol, the frequency of the fourth clock signal being different from the frequency of the source signal;

the frequencies of the first, second, third and fourth clock signals being different from each other;

wherein the one or more network diagnostic functions comprise any of the following network diagnostic functions:

a bit-error-rate-tester network diagnostic function comprising:
  generating an initial version of a bit sequence;
  transmitting the initial version of the bit sequence over at least a portion of network;
  receiving a version of the transmitted bit sequence; and
  comparing at least a portion of the initial version of the bit sequence with at least a portion of the received version of the bit sequence;

a generator network diagnostic function comprising:
  generating a first bit sequence; and
  transmitting the first bit sequence over at least a portion of network;
  wherein the first bit sequence comprises a plurality of network messages simulating traffic between at least two nodes on the network;

a jammer network diagnostic function comprising:
  receiving a second bit sequence comprising at least one network message;
  altering at least a portion of the second bit sequence; and
  transmitting at least a portion of the altered bit sequence;

a protocol-analyzer network diagnostic function comprising:
  receiving a third bit sequence comprising at least one network message;
  comparing at least a portion of the third bit sequence with a fourth bit sequence; and
  in response to the comparison, executing a capture of a fifth bit sequence comprising at least a portion of a network message; and a monitor network diagnostic function comprising:
  receiving a sixth bit sequence comprising at least one network message;
  comparing at least a portion of the sixth bit sequence with an seventh bit sequence; and
  in response to the comparison, generating one or more statistics.

21. The network diagnostic system of claim 20, wherein the frequency of the first clock signal is approximately x; wherein x=((1.5 GHz)* a); wherein a is an integer greater than 0; wherein the frequency of the third clock signal is approximately y; wherein y=((1.25 GHz)*b); and wherein b is an integer greater than 0.

22. The network diagnostic system of claim 20, wherein the frequency of the first clock signal is approximately x; wherein x=((1.0625 GHz)*a); wherein a is an integer greater than 0; wherein the frequency of the third clock signal is approximately y; wherein y=((1.5 GHz)*b); and wherein b is an integer greater than 0.

23. The network diagnostic system of claim 20, wherein the frequency of the first clock signal is approximately x; wherein x=((1.25 GHz)*a); wherein a is an integer greater than 0; wherein the frequency of the third clock signal is approximately y; wherein y=((1.0625 GHz)*b); and wherein b is an integer greater than 0.

24. The network diagnostic system of claim 20, wherein the one or more network diagnostic functions comprise at least the bit error rate tester network diagnostic function.

25. The network diagnostic system of claim 20, wherein the one or more network diagnostic functions comprise at least the generator network diagnostic function.

26. The network diagnostic system of claim 20, wherein the one or more network diagnostic functions comprise at least the jammer network diagnostic function.

27. The network diagnostic system of claim 20, wherein the one or more network diagnostic functions comprise at least the protocol-analyzer network diagnostic function.

28. The network diagnostic system of claim 20, wherein the one or more network diagnostic functions comprise at least the monitor network diagnostic function.

29. The network diagnostic system of claim 20, wherein the one or more network diagnostic functions comprise each of the bit error rate tester network diagnostic function, the generator network diagnostic function, the jammer network diagnostic function, the protocol-analyzer network diagnostic function, and the monitor network diagnostic function.

30. A network diagnostic system comprising:
  a network diagnostic module configured to perform one or more network diagnostic functions, the network diagnostic module comprising a frequency chip, the frequency chip being programmable among at least two configurations, including a first configuration and a second configuration;
  in the first configuration, the frequency chip being configured to generate a first clock signal from a source signal, the first clock signal having a frequency, the frequency of the first clock signal being configured to support a data rate of a first network protocol, the source signal having a frequency, the frequency of the first clock signal being different from the frequency of the source signal;
  in the second configuration, the frequency chip being configured to generate a second clock signal from the source signal, the second clock signal having a frequency, the frequency of the second clock signal being configured to support a data rate of a second network protocol, the frequency of the second clock signal being different from the frequency of the source signal, the frequency of the second clock signal being different from the frequency of the first clock signal;
  wherein the one or more network diagnostic functions comprise any of the following network diagnostic functions:
  a bit-error-rate-tester network diagnostic function comprising:
    generating an initial version of a bit sequence;
    transmitting the initial version of the bit sequence over at least a portion of network;
    receiving a version of the transmitted bit sequence; and
    comparing at least a portion of the initial version of the bit sequence with at least a portion of the received version of the bit sequence;
  a generator network diagnostic function comprising:
    generating a first bit sequence; and
    transmitting the first bit sequence over at least a portion of network;
    wherein the first bit sequence comprises a plurality of network messages simulating traffic between at least two nodes on the network;
  a jammer network diagnostic function comprising:
    receiving a second bit sequence comprising at least one network message;
    altering at least a portion of the second bit sequence; and
    transmitting at least a portion of the altered bit sequence;

a protocol-analyzer network diagnostic function comprising:
  receiving a third bit sequence comprising at least one network message;
  comparing at least a portion of the third bit sequence with a fourth bit sequence; and
  in response to the comparison, executing a capture of a fifth bit sequence comprising at least a portion of a network message; and
a monitor network diagnostic function comprising:
  receiving a sixth bit sequence comprising at least one network message;
  comparing at least a portion of the sixth bit sequence with an seventh bit sequence; and
  in response to the comparison, generating one or more statistics.

31. The network diagnostic system of claim 30, wherein the one or more network diagnostic functions comprise at least the bit error rate tester network diagnostic function.

32. The network diagnostic system of claim 30, wherein the one or more network diagnostic functions comprise at least the generator network diagnostic function.

33. The network diagnostic system of claim 30, wherein the one or more network diagnostic functions comprise at least the jammer network diagnostic function.

34. The network diagnostic system of claim 30, wherein the one or more network diagnostic functions comprise at least the protocol-analyzer network diagnostic function.

35. The network diagnostic system of claim 30, wherein the one or more network diagnostic functions comprise at least the monitor network diagnostic function.

36. The network diagnostic system of claim 30, wherein the one or more network diagnostic functions comprise each of the bit error rate tester network diagnostic function, the generator network diagnostic function, the jammer network diagnostic function, the protocol-analyzer network diagnostic function, and the monitor network diagnostic function.

37. A network diagnostic system comprising:
  a network diagnostic module configured to perform one or more network diagnostic functions, the network diagnostic module comprising an oscillator module, the oscillator module being programmable among at least four configurations, including a first configuration, a second configuration, a third configuration and a fourth configuration;
  in the first configuration, the oscillator module being configured to generate a first clock signal from a source signal, the first clock signal having a frequency, the frequency of the first clock signal being configured to support a first data rate of a first network protocol, the source signal having a frequency, the frequency of the first clock signal being different from the frequency of the source signal; and
  in the second configuration, the oscillator module being configured to generate a second clock signal from the source signal, the second clock signal having a frequency, the frequency of the second clock signal being configured to support a second data rate of the first network protocol, the frequency of the second clock signal being different from the frequency of the source signal;
  in the third configuration, the oscillator module being configured to generate a third clock signal from a source signal, the third clock signal having a frequency, the frequency of the third clock signal being configured to support a first data rate of a second network protocol, the frequency of the third clock signal being different from the frequency of the source signal;
  in the fourth configuration, the oscillator module being configured to generate a fourth clock signal from the source signal, the fourth clock signal having a frequency, the frequency of the fourth clock signal being configured to support a second data rate of the second network protocol, the frequency of the fourth clock signal being different from the frequency of the source signal;
  the frequencies of the first, second, third and fourth clock signals being different from each other;
  wherein the one or more network diagnostic functions comprise any of the following network diagnostic functions:
  a bit-error-rate-tester network diagnostic function comprising:
    generating an initial version of a bit sequence;
    transmitting the initial version of the bit sequence over at least a portion of network;
    receiving a version of the transmitted bit sequence; and
    comparing at least a portion of the initial version of the bit sequence with at least a portion of the received version of the bit sequence;
  a generator network diagnostic function comprising:
    generating a first bit sequence; and
    transmitting the first bit sequence over at least a portion of network;
    wherein the first bit sequence comprises a plurality of network messages simulating traffic between at least two nodes on the network;
  a jammer network diagnostic function comprising:
    receiving a second bit sequence comprising at least one network message;
    altering at least a portion of the second bit sequence; and
    transmitting at least a portion of the altered bit sequence;
  a protocol-analyzer network diagnostic function comprising:
    receiving a third bit sequence comprising at least one network message;
    comparing at least a portion of the third bit sequence with a fourth bit sequence; and
    in response to the comparison, executing a capture of a fifth bit sequence comprising at least a portion of a network message; and
  a monitor network diagnostic function comprising:
    receiving a sixth bit sequence comprising at least one network message;
    comparing at least a portion of the sixth bit sequence with an seventh bit sequence; and
    in response to the comparison, generating one or more statistics.

* * * * *

UNITED STATES PATENT AND TRADEMARK OFFICE
CERTIFICATE OF CORRECTION

| | |
|---|---|
| PATENT NO. | : 7,516,046 B2 |
| APPLICATION NO. | : 11/344829 |
| DATED | : April 7, 2009 |
| INVENTOR(S) | : Lawson et al. |

It is certified that error appears in the above-identified patent and that said Letters Patent is hereby corrected as shown below:

Column 2
Line 54, after "of" insert --the--

Column 4
Line 37, after "perform" insert --a--
Line 51, before "variety" insert --a--

Column 7
Line 26, change "having second" to --having a second--
Line 29, change "having second" to --having a second--
Line 32, change "having" to --having a--

Column 9
Line 4, change "send" to --sends--
Line 35, change "A." to --A--
Line 66, change "10B" to --110B--

Column 10
Line 33, change "from first" to --from the first--
Line 44, change "10C" to --110C--
Line 50, change "a" to --an--
Line 57, unbold "M8"
Line 58, unbold "M0"

Column 11
Line 7, change "having frequency" to --having a frequency--
Line 46, change "10C" to --110C--

Signed and Sealed this
Twenty-second Day of March, 2011

David J. Kappos
*Director of the United States Patent and Trademark Office*

Column 12
Line 41, change "10C" to --110C--
Line 55, change "10C" to --110C--

Column 13
Line 15, change "less" to --lesser--
Line 47, change ""ASICs")" to --("ASICs")--

Column 14
Line 17, change "or" to --and--
Lines 66-67, change "functions;" to -- functions:--

Column 15
Lines 1-2, change "comprising;" to --comprising:--
Line 36, change "an seventh" to --a seventh--

Column 16
Line 34, after "comprising:" insert carriage return

Column 17
Line 44, change "an seventh" to --a seventh--

Column 19
Line 15, change "an seventh" to --a seventh--

Column 20
Line 57, change "an seventh" to --a seventh--